US007465765B2

(12) United States Patent
Ganapathiappan et al.

(10) Patent No.: US 7,465,765 B2
(45) Date of Patent: Dec. 16, 2008

(54) LATEX PARTICULATES WITH EPOXIDE FUNCTIONAL GROUPS

(75) Inventors: Sivapackia Ganapathiappan, Los Altos, CA (US); Zhang-Lin Zhou, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 281 days.

(21) Appl. No.: 10/952,262

(22) Filed: Sep. 27, 2004

(65) Prior Publication Data

US 2006/0074185 A1 Apr. 6, 2006

(51) Int. Cl.
*C08J 73/02* (2006.01)
(52) U.S. Cl. .................. 524/800; 524/514; 524/700; 524/911; 521/65; 521/69; 521/70
(58) Field of Classification Search ............ 521/65, 521/69, 70; 524/514, 700, 800, 911
See application file for complete search history.

(56) References Cited

U.S. PATENT DOCUMENTS

| 3,001,975 | A |   | 9/1961  | Ellington et al. |        |
|-----------|---|---|---------|------------------|--------|
| 4,002,586 | A |   | 1/1977  | Wessling et al.  |        |
| 4,415,700 | A |   | 11/1983 | Batz et al.      |        |
| 4,703,018 | A | * | 10/1987 | Craig et al. ........... | 436/518 |
| 5,409,971 | A | * | 4/1995  | Wolfersberger et al. ..... | 523/201 |
| 5,708,095 | A | * | 1/1998  | Grezzo Page et al. ....... | 525/301 |
| 6,180,691 | B1| * | 1/2001  | Cheng et al. ............ | 523/160 |
| 6,465,562 | B1|   | 10/2002 | Charmot et al.   |        |

FOREIGN PATENT DOCUMENTS

| EP | 0071704    | 2/1983  |
| EP | 0582062    | 2/1994  |
| EP | 0653469    | 5/1995  |
| EP | 0887391    | 12/1998 |
| GB | 926283     | 5/1963  |
| WO | WO 97/06438| 2/1997  |
| WO | WO 9706438 | 2/1997  |

OTHER PUBLICATIONS

Molday, Robert S, William J. Dryer, Alan Rembaum and S.P.S. Yen, "New Immunolatex Spheres: Visual Markers of Antigens on Lymphocytes for Scanning Electron Microscopy," The Journal of Cell Biology, vol. 64, 1975, pp. 75-88.
Cousin, P. and P. Smith, "Synthesis and Characterization of Styrene-Based Microbeads Possessing Amine Functionality," Jour Appl Poly Sci, vol. 54, 1994, pp. 1631-1641.
Ganachaud, F., F. Sauzedde, A. Elaissari and c. Pichot, "Emulsifier-Free Emulsion Copolymerization of Styrene with Two Different Amino-Containing Cationic Monomers. I. Kinetic Studies," Journal of Applied Polymer Science, vol. 65, 1997, 2315-2330.
Basinska, T. and S. Slomkowski, "Attachment of Horseradish Peroxidase (HRP) onto the poly(styrene/acrolein) Latexes and onto their Derivatives with Amino Groups on the Surface; Activity of Immobilized Enzyme," Colloid Polym Sci vol. 273, 1995, 431-438.
Covolan, Vera L., Lucia H. Innocentini Mei and Claudio L. Rossi, "Chemical Modifications on Polystyrene Latex: Preparation and Characterization for Use in Immunological Applications," Polymers for Advanced Technologies, vol. 8, 1997, pp. 44-50.
Quash, G., Ann-Marie Roch, A. Niveleau, J. Grange, T. Keolouanghiiot and J. Huppert, "The Preparation of Latex Particles with Covalently Bound Polyamines, IgG and Measles Agglutinins and Their Use in Visual Agglutination Tests," Journal of Immunological Methods, 22, 1978, 165-174.

* cited by examiner

*Primary Examiner*—Randy Gulakowski
*Assistant Examiner*—Michael M Bernshteyn

(57) ABSTRACT

The present invention is drawn to compositions and methods of generating epoxide group-functionalized latex particulates in a liquid suspension, as well as compositions and methods of preparing ink-jet inks. Steps of the methods can include forming an emulsion including a continuous hydrophilic phase and a discontinuous hydrophobic phase, wherein the discontinuous hydrophobic phase includes a plurality of monomers. The plurality of monomers can comprise epoxide group-forming monomers and support-forming monomers. Other steps include copolymerizing the monomers to form precursor latex particulates dispersed within the hydrophilic phase, and reacting the precursor latex particulates with a base to form epoxide group-functionalized latex particulates. These latex particulates can be used in a wide variety of applications, including in ink-jet ink printing applications.

9 Claims, No Drawings

LATEX PARTICULATES WITH EPOXIDE FUNCTIONAL GROUPS

FIELD OF THE INVENTION

The present invention relates generally to surface functionalized latex particulates and a method for the manufacture thereof.

BACKGROUND OF THE INVENTION

Latex particles obtained by emulsion polymerization can have a variety of applications, including for use as model colloids for calibration of instruments used to measure particle size, for immobilization of biomolecules (such as proteins or peptides) on the surface of the particles, for development of new types of immunoassays, and for film formation for ink-jet printing, painting, and coating applications. A commonly used method for connecting biological molecules, dye molecules, or the like, to the surface of latex particles is by physical or passive adsorption. However, resulting colloid systems tend to be less stable. Such instability can be avoided by covalently bonding biomolecules, dye molecules, or the like, to latex particulates of an emulsion. While functionalized latex particulates have applications in these and other fields, the ink-jet ink imaging application can be used to favorably illustrate unique advantages of the invention. Specifically, there has been great improvement in the area of water durability of ink-jet inks through incorporation of certain ink-jet compatible latex polymers. When printed as part of an ink-jet ink, a latex component of the ink can form a film on a media surface, entrapping and protecting the colorant within the hydrophobic print film.

This being the case, there is a continuing need to provide improved methods of preparing latex particulates having functional groups on the surface, which can in turn be used for chemical reaction with target molecules.

SUMMARY OF THE INVENTION

It has been recognized that it would be advantageous to develop manufacturing procedures for the preparation of surface functionalized latex particulates, which can be used for ink-jet ink and other applications. For example, the addition of latex polymers that may be attached to colorants can improve durability of ink jet-ink prints by improving water fastness, smear fastness, and/or light fastness. In furtherance of this recognition, a latex composition can comprise an aqueous liquid having epoxide group-functionalized latex particulates dispersed therein.

In another embodiment, a method of generating a liquid suspension including epoxide group-functionalized latex particulates can comprise the step of forming an emulsion including a continuous hydrophilic phase and a discontinuous hydrophobic phase, wherein the discontinuous hydrophobic phase includes a plurality of monomers, such as epoxide group-forming monomers and support-forming monomers. Other steps include copolymerizing the monomers to form precursor latex particulates dispersed within the hydrophilic phase, and reacting the precursor latex particulates with a base to form epoxide group-functionalized latex particulates.

In another embodiment, an ink-jet ink composition can comprise a liquid vehicle, epoxide-group functionalized latex particulates dispersed in the liquid vehicle, and a nucleophilic colorant dispersed or dissolved in the liquid vehicle. At least a portion of the nucleophilic colorant in this embodiment can be reacted with the epoxide group-functionalized latex particulates.

A method of preparing an ink-jet ink can comprise admixing a nucleophilic colorant with a latex, wherein the latex includes a liquid phase and epoxide group-functionalized latex particulates dispersed in the liquid phase. Another step can include interacting the nucleophilic colorant with the epoxide group-functionalized latex particulates to form colorant-modified latex particulates.

In another embodiment, a composition for sensor applications can comprise a continuous liquid phase, epoxide group-functionalized latex particulates dispersed in the continuous liquid phase, and nucleophilic chemical or biological sensing molecules. In this embodiment, at least a portion of the nucleophilic chemical or biological sensing molecules can be coupled to the epoxide group-functionalized latex particulates.

Further, a method of preparing a composition for sensor applications can comprise admixing nucleophilic chemical or biological molecules with a latex, wherein the latex includes a continuous liquid phase and epoxide group-functionalized latex particulates dispersed in the liquid phase. Another step can include interacting the nucleophilic chemical or biological molecule with the epoxide group-functionalized latex particulates to form chemical or biological sensing molecule-modified latex particulates.

Additional features and advantages of the invention will be apparent from the detailed description that follows which illustrates, by way of example, features of the invention.

DETAILED DESCRIPTION OF THE PREFERRED EMBODIMENT(S)

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

It must be noted that, as used in this specification and the appended claims, the singular forms "a," "an," and "the" include plural referents unless the context clearly dictates otherwise.

Likewise, the use of plural referents does not necessarily imply the use of multiple compositions. For example, referring to monomers in the plural form does not necessarily mean that multiple monomer types are present, but that multiple actual monomer molecules of at least one type are present. Such a reference does not, however, preclude the presence of other monomer types.

The term "epoxide group-functionalized" when referring to latex particulates indicates at least one latex particulate that includes epoxide groups present on the latex particulate. Typically, the epoxide groups will be present at a surface of the latex particulate, though this is not required.

The term "epoxide group-forming" when referring to monomers used to form epoxide group-functionalized latex particulates refers to monomers that are at least relatively stable during emulsion polymerization, and which can be readily converted to include epoxide groups. For example, an epoxide group-forming monomer can include the group —CH(OH)—CH$_2$-LG, where LG is a leaving group. This group is stable during emulsion polymerization or copolymerization with other monomers, and can readily be converted to include an epoxide group upon reaction with a base.

Upon such reaction, the leaving group is removed and an epoxide group is formed. One skilled in the art would recognize that variations of this group can also be used to form an epoxide group.

"Precursor latex particulate(s)" refers to latex particulates formed that have groups which can be converted to epoxide groups upon interaction or reaction with a base. For example, a group having the structure —CH(OH)—CH$_2$-LG present on a monomer used to form a latex particulate. In this example, LG represents a leaving group that is configured such that upon reaction with a base, the leaving group is removed and an epoxide group is formed.

"Support-forming monomers" refers to one or more monomer type that can be copolymerized with epoxide group-forming monomers to form the epoxide group-functionalized latex particulates (after reaction with a base) in accordance with embodiments of the present invention. Support-forming monomers can provide bulk properties to monomers, can be film-forming monomers, or can provide other desirable properties, depending on the application for which the latex particulates are prepared. For example, in ink-jet applications, it may be desirable to select support-forming monomers that have properties for promoting the formation of films once the latex is printed on a media substrate. Alternatively, if it is desirable to form latex particulates for biological or chemical sensor applications, it may be desirable to maintain the bulk properties of the latex.

The term "nucleophile" or "nucleophilic" refers to compositions, such as biological or chemical sensor compositions, dyes, additives, or other molecules that have a group that is attracted to nuclei and tends to donate or share electrons. In the ink-jet arts, for example, the addition of latex polymers attached to nulceophilic colorants can improve the durability of ink-jet ink prints, such as with respect to water fastness, smear fastness, and light fastness.

"Colorant" can include dyes, pigments, and/or other particulates that may be suspended or solvated in a liquid vehicle in accordance with embodiments of the present invention. Dyes are typically water soluble, and therefore, can be desirable for use in many embodiments. However, pigments can also be used. Pigments that can be used include self-dispersed pigments and dispersant-dispersed pigments. Self-dispersed pigments include those that have been chemically surface modified with a small molecule or a polymeric grouping, such as to charge the surface. This chemical modification aids the pigment in becoming and/or substantially remaining dispersed in a liquid vehicle. The pigment can also be a dispersant-dispersed pigment (also commonly referred to as a polymer-dispersed pigment, where the polymer is not covalently attached to the pigment) that utilizes a dispersant (which can be a polymer, an oligomer, or a surfactant, for example) in the liquid vehicle and/or in the pigment that utilizes a physical coating to aid the pigment in becoming and/or substantially remaining dispersed in a liquid vehicle.

The term "about" when referring to a numerical value or range is intended to encompass the values resulting from experimental error that can occur when taking measurements.

As used herein, "liquid vehicle" is defined to include liquid compositions that can be used to carry colorants to a substrate. Liquid vehicles are well known in the art, and a wide variety of ink vehicles may be used in accordance with embodiments of the present invention. Such ink vehicles may include a mixture of a variety of different agents, including without limitation, surfactants, solvents, co-solvents, buffers, biocides, viscosity modifiers, sequestering agents, stabilizing agents, and water. The liquid vehicle can also carry other additives such as latex particulates and other polymers, UV curable materials, plasticizers, and/or co-solvents in some embodiments. The terms "liquid phase" and "aqueous liquid" can also be used to describe a liquids used to carry the latex particulates of the present invention. Liquid phase, liquid vehicle, and aqueous liquid can be used interchangeably; however, the terms liquid phase or aqueous liquid are generally used when discussing embodiments that are other than ink-jet ink embodiments, e.g., prior to inclusion of nucleophilic colorant, biological or chemical sensor embodiments, etc.

Concentrations, amounts, and other numerical data may be expressed or presented herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "0.1 wt % to 5 wt %" should be interpreted to include not only the explicitly recited concentration of 0.1 wt % to 5 wt %, but also include individual concentrations and the sub-ranges within the indicated range. Thus, included in this numerical range are individual concentrations, such as 1 wt %, 2 wt %, 3 wt %, and 4 wt %, and sub-ranges, such as from 0.1 wt % to 1.5 wt %, 1 wt % to 3 wt %, from 2 wt % to 4 wt %, from 3 wt % to 5 wt %, etc. This same principle applies to ranges reciting only one numerical value. For example, a range recited as "less than 5 wt %" should be interpreted to include all values and sub-ranges between 0 wt % and 5 wt %. Furthermore, such an interpretation should apply regardless of the breadth of the range or the characteristics being described.

With this in mind, it has been recognized that it would be advantageous to develop a practical method for the preparation of latex polymer particulates having reactive functional groups on the surface. Specifically, these reactive functional groups are epoxide groups that can be reacted with nucleophile-containing molecules, as are often present on dyes and other molecules. Examples of such nuceophilic groups include primary amine (amino), secondary amine, thiol, hydroxyl, etc. Examples of molecules other than dyes that can include nucleophilic groups, and which can react with the epoxide groups of the latex particulates include biological molecules such as those used as bio-sensors or bio-detection, chemical sensors, or the like. In other words, the epoxide groups can be used to attach dye molecules, biological molecules, or other useful molecules, to the latex particulate surface.

In one embodiment, a latex composition can comprise an aqueous liquid having epoxide group-functionalized latex particulates dispersed therein.

In another embodiment, a method of generating a liquid suspension including epoxide group-functionalized latex particulates can comprise the step of forming an emulsion including a continuous hydrophilic phase and a discontinuous hydrophobic phase, wherein the discontinuous hydrophobic phase includes a plurality of monomers, such as epoxide group-forming monomers and support-forming monomers. Other steps include copolymerizing the monomers to form precursor latex particulates dispersed within the hydrophilic phase, and reacting the precursor latex particulates with a base to form epoxide group-functionalized latex particulates.

In another embodiment, an ink-jet ink composition can comprise a liquid vehicle, epoxide-group functionalized latex particulates dispersed in the liquid vehicle, and a nucleophilic colorant dispersed or dissolved in the liquid vehicle. At least a portion of the nucleophilic colorant in this embodiment can be reacted with the epoxide group-functionalized latex particulates. Upon printing the ink-jet ink onto a media substrate, the image can exhibit improved durability, e.g., smudge resistance, humid fastness, dry rub resistance, etc., compared to ink-jet inks having the similar components except where there is no reaction between a colorant and the latex particulates.

A method of preparing an ink-jet ink can comprise admixing a nucleophilic colorant with a latex, wherein the latex includes a liquid phase and epoxide group-functionalized latex particulates dispersed in the liquid phase. Another step can include interacting the nucleophilic colorant with the epoxide group-functionalized latex particulates to form colorant-modified latex particulates.

In another embodiment, a composition for sensor applications can comprise a continuous liquid phase, epoxide group-functionalized latex particulates dispersed in the continuous liquid phase, and nucleophilic chemical or biological sensing molecules. In this embodiment, at least a portion of the nucleophilic chemical or biological sensing molecules can be coupled to the epoxide group-functionalized latex particulates.

Further, a method of preparing a composition for sensor applications can comprise admixing nucleophilic chemical or biological molecules with a latex, wherein the latex includes a continuous liquid phase and epoxide group-functionalized latex particulates dispersed in the liquid phase. Another step can include interacting the nucleophilic chemical or biological molecule with the epoxide group-functionalized latex particulates to form chemical or biological sensing molecule-modified latex particulates.

Formulas 1-3 provide representative exemplary preparative schemes in accordance with embodiments of the present invention, as follows:

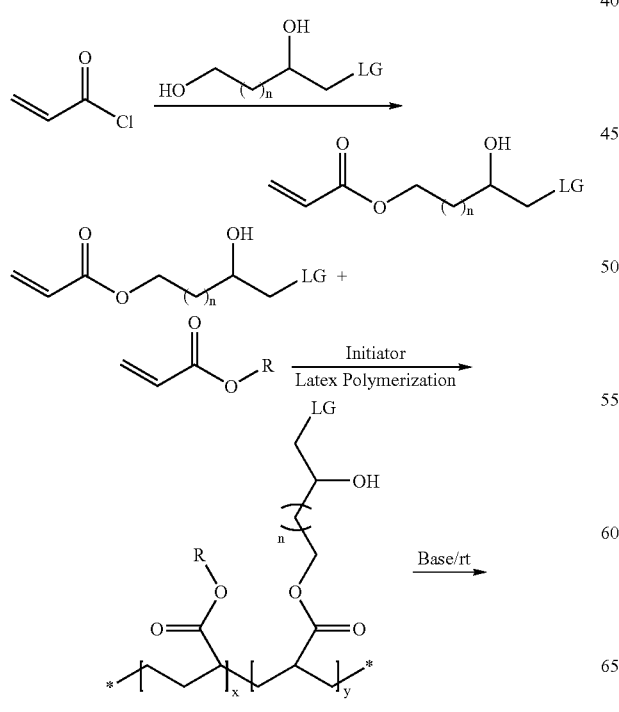

-continued

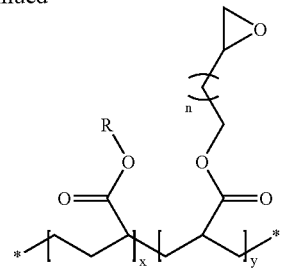

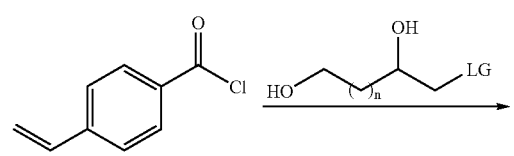

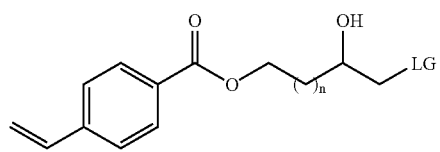

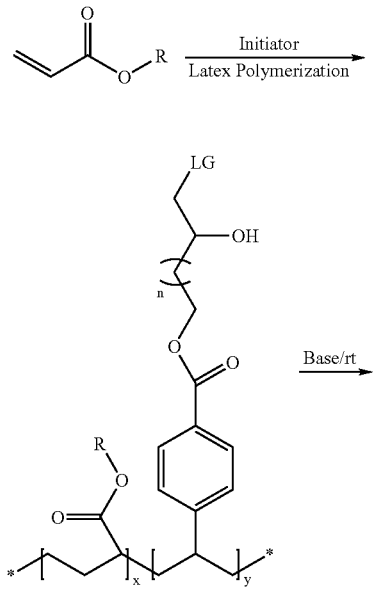

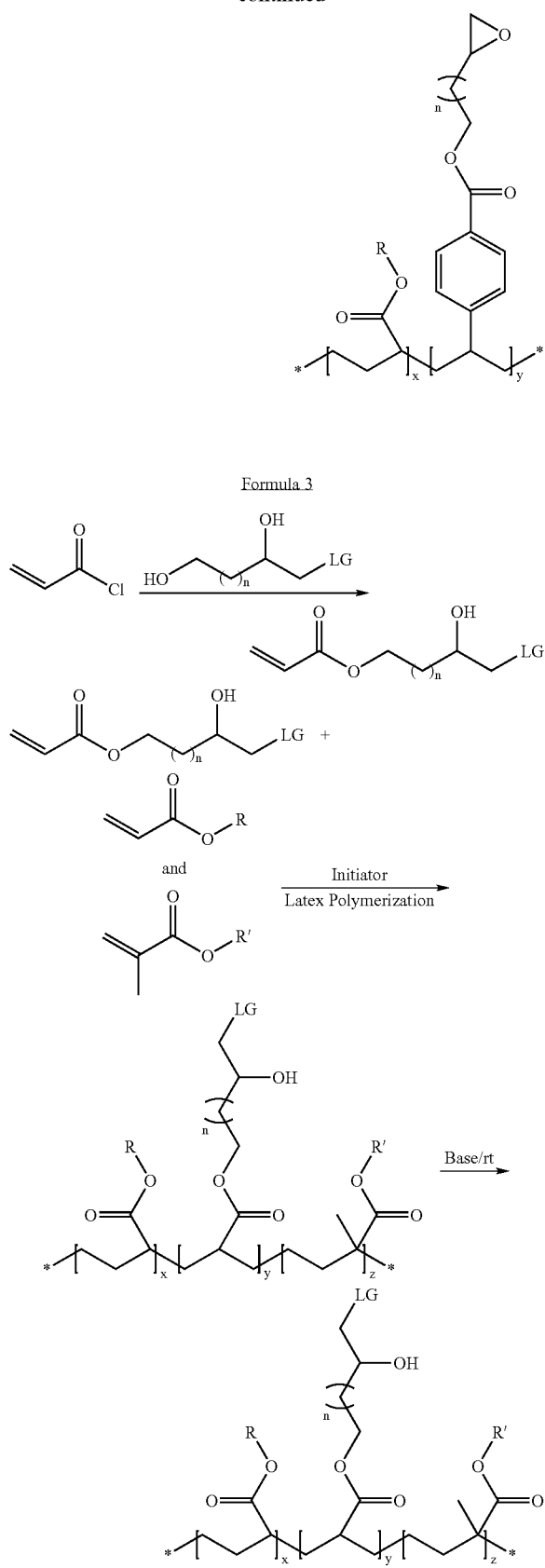

Formula 3

In Formulas 1-3 above, x, y, and z can represent the number of monomer units in the polymer backbone, and can be formed as one of various types of copolymers. Typically, random copolymers can be prepared as shown above. In one embodiment, each of x, y, and z can independently be from 2 to 5000. As noted, the z variable is only applicable to Formula 3. Likewise, in each of Formula 1-3, n can range from 0 to 20, thereby indicating the number of methylene units present, i.e., when n is 0, there is one methylene unit, when n is 2, there are three methylene units, etc. R (and R' in the case of Formula 3) can represent H, or any alkyl, aryl, or substituted aryl group. Examples of alkyl groups include methyl, ethyl, propyl (including isopropyl), butyl (including t-butyl and isobutyl), pentyl, (including straight chain and branched), hexyl (including straight chain and branched), etc. LG represents a leaving group, such as halide, —OMs, —OTs, OTf, etc. (where Ms is mesityl, Ts is p-toluenesulfonyl, and Tf is trifluoromethanesulfonyl). This being stated, any leaving group that is reactive with a base, and which, upon leaving, causes an epoxide group to form can be used.

As shown in Formulas 1-3, general preparative embodiments of exemplary epoxide group-functionalized latex particulates are shown, wherein the latex is a copolymer that includes an epoxide group-forming monomer that is treated with a base to form the epoxide group. Additionally, specific types of support-forming monomers are also shown, which are particularly useful in the ink-jet ink arts, e.g., acrylic acid or acrylate monomers and/or methacrylic acid or methacrylate monomers. These film-forming monomers can be included to provide film-forming properties of the latex particulates. In other words, these monomers of the latex particulates can act to form a film upon printing the ink on a media substrate. Such film-forming properties can contribute to image permanence. However, it is to be noted that other support-forming monomers can be used which also have film-forming properties, or which have other desirable properties, e.g., bulk properties. Alternatively, though each of the embodiments shown depicts the preparation of copolymers, in one embodiment, other monomers do not have to be present, thereby forming a homopolymer. In either embodiment, whether the precursor latex particulates are part of a copolymer or a homopolymer, upon reaction with the base, from a portion to all of the epoxide group-forming monomers polymerized in the latex particulate can be converted to include epoxide groups.

The epoxide group-forming monomer(s), once reacted with a base to form epoxide groups, can provide a means for reacting nucleophile-containing molecules, such as nucleophile-containing dyes, chemical sensor molecules, biological sensor molecules, etc., with the latex particulates in accordance with embodiments of the present invention. Examples of nucleophile-containing molecules that can be attached to the active ester-containing latex particulates of the present invention include dyes and other molecules that have nucleophilic groups, such as amino group(s), secondary amine group(s), thiol group(s), hydroxy group(s), and the like. In other words, after polymerization and reaction with a base to form the epoxide groups, if it is desired to attach a dye or other molecule to the latex particulates, one can select such molecules that include a nucleophilic moiety. As this method of preparing epoxide group-functionalized latex particulate does not add any chemicals to the emulsion system, the latex emulsion can typically remain stable.

The preparation of latex particulates in accordance with some embodiments of the present invention can result in a latex emulsion having latex particulates of a weight average molecular weight from 10,000 Mw to 5,000,000 Mw. This range is only exemplary and can be broader, as indicated by the number of monomers described in the Formulas 1 to 3 above. Additionally, the formulations shown above are exemplary only, depicting only specific copolymers. Other copolymers can be prepared in accordance with embodiments of the present invention. For example, other monomers can be used (both epoxide group-forming monomers not specifically shown as well as other support-forming monomers not specifically shown). Further, various types of polymers can be formed, including block copolymers, randomly assembled copolymers, copolymers including crosslinkers, or the like. Still further, monomers with other types of functional groups can be copolymerized with other monomers with or without functional groups at various ratios to provide various results. If a crosslinking agent is used to crosslink a polymer, the application of use of the resultant latex particulate can be considered. For example, if the latex particulate is to be used in an ink-jet printing system, then from 0.1 wt % to 10 wt % of the crosslinking agent can be present with the monomers and copolymerized therewith.

It should be noted that the preparation of a latex, which includes the latex particulates and a liquid phase, and the preparation of an ink-jet ink that includes a latex, can be carried out in many different ways. In one embodiment, the liquid phase of the latex and a liquid vehicle of an ink can become admixed to form a modified liquid vehicle containing latex particulates and colorant. If the colorant is a dye, then the dye is typically solvated in the liquid vehicle. In this embodiment, the total amount of solids in the ink-jet ink will be primarily due to the presence of latex particulates prepared in accordance with embodiments of the present invention. In one embodiment, the dye can include a nucelophilic group that is reactive with the epoxide group of the latex, thus providing dye-modified latex particulates in the ink-jet ink. Alternatively, the colorant can be a pigment. If the pigment is a self-dispersed or dispersant-dispersed pigment, the total solids content of the latex particulates and pigments should be considered when determining relative amounts that should be present for jettability purposes, as is known in the art. If utilizing a colorant to form an ink-jet ink, the method can further comprise the step of reacting the colorant with the functionalized latex particulates to form colorant-bound latex particulates.

Alternatively, if no colorant is used, but rather, the latex is admixed with a liquid vehicle to form an ink-jettable colorless solution or dispersion, then an ink-jettable protective coating material can be formed. In this embodiment, typically, an ink-jet ink can be jetted onto a substrate to produce an image, and the ink-jettable colorless solution can be overprinted with respect to the printed image for protection. If the ink-jet ink includes a nucleophilic dye, the colorless solution or dispersion can react with the dye at the interface between the ink-jet ink and the colorless solution or dispersion layer, or upon liquid mixing on the print medium. In other words, the latex particulates can form a film over the printed image, and as the latex particulates are functionalized with epoxide groups, the functional surfaces of the latex particulates can interact with the colorant or other component of the printed ink-jet ink to provide additional protection to the image.

A typical liquid vehicle formulation that can be used with the latexes described herein can include water, and optionally, one or more co-solvents present in total at from 0.1 wt % to 30 wt %, depending on the ink-jet architecture and/or other considerations known in the art. Optionally, one or more non-ionic, cationic, and/or anionic surfactants can be present, ranging from 0.1 wt % to 5.0 wt %. The balance of the formulation can be purified water, or other vehicle components known in the art, such as biocides, viscosity modifiers, materials for pH adjustment, sequestering agents, preservatives, and the like. Typically, the liquid vehicle is predominantly water.

Classes of co-solvents that can be used include aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include trimethylolpropane, 2-pyrrolidinone, and 1,5-pentanediol.

One or more of many surfactants can also be used as are known by those skilled in the art of ink formulation and may be alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the formulation of this invention may range from 0 wt % to 5.0 wt %.

Consistent with the formulation of this invention, various other additives may be employed to optimize the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, Nuosept (Nudex, Inc.), Ucarcide (Union carbide Corp.), Vancide (R.T. Vanderbilt Co.), Proxel (ICI America), and combinations thereof.

Sequestering agents, such as EDTA (ethylene diamine tetra acetic acid), may be included to eliminate the deleterious effects of heavy metal impurities, and buffer solutions may be used to control the pH of the ink. From 0 wt % to 2.0 wt %, for example, can be used. Viscosity modifiers and buffers may also be present, as well as other additives known to those skilled in the art to modify properties of the ink as desired. Such additives can be present at from 0 wt % to 20.0 wt %.

EXAMPLES

The following examples illustrate embodiments of the invention that are presently known. Thus, these examples should not be considered as limitations of the present invention, but are merely in place to teach how to make the best-known compositions of the present invention based upon current experimental data. As such, a representative number of compositions and their method of manufacture are disclosed herein.

Example 1

Preparation of Epoxide Group-Forming Polymerizable Monomers 1-cholro-2,4-dihydroxybutane is reacted with methacryloyl chloride at a 1:1 molar ratio in the presence of triethylamine to obtain a 1-chloro-2-hydroxybutyl methacrylate. This method resulted in the production of a polymerizable monomer having an epoxide group-forming monomer.

Example 2

Preparation of Epoxide Group-Functionalized Latex Particulates

The polymerizable epoxide group-forming monomer (10 wt %) of Example 1 is mixed with methyl methacrylate (42 wt %), hexyl acrylate (42 wt %), and methacrylic acid (6 wt %) to form a monomer mixture. Though a cross-linker is not used in this example, it is to be noted that a cross-linker can be used, e.g., ethylene glycol dimethacrylate (0.5 wt % to 10 wt %). The monomer mixture (about 35 wt %) is emulsified with Rhodafac RS 710 surfactant (2.5 wt % with respect to the monomers) and a balance of water. The monomer emulsion is added drop wise to hot water containing a potassium persulfate water soluble initiator (about 0.4 wt % with respect to the monomers). The heating is continued for a period of two hours and then cooled to ambient temperature. The latex, in the form of a precursor, is neutralized and reacted with potassium hydroxide solution to obtain latex particulates having epoxide groups. The particulates formed are present in a latex dispersion or emulsion.

Example 3

Ink-Jet Ink Preparation

The latex emulsion prepared in accordance with Example 2 (equivalent to 2.5 g solid polymer) is mixed with a nucleophilic dye along with a liquid vehicle (20 g). The liquid vehicle includes water, 2-pyrrolidone, and ethylene glycol. The concentration of the dye is about 3 wt %. As the dye selected for use includes a nucleophilic group, the dye molecule reacts with the active ester of the latex particulates, thereby coupling at least a portion of the dye molecules to the latex particulates.

While the invention has been described with reference to certain preferred embodiments, those skilled in the art will appreciate that various modifications, changes, omissions, and substitutions can be made without departing from the spirit of the invention. It is intended, therefore, that the invention be limited only by the scope of the following claims.

What is claimed is:

1. A method of generating a liquid suspension including epoxide group-functionalized latex particulates, comprising steps of:
   a) forming an emulsion including a continuous hydrophilic phase and a discontinuous hydrophobic phase, said discontinuous hydrophobic phase including a plurality of monomers, said monomers comprising:
      i) epoxide group-forming monomers, and
      ii) support-forming monomers;
   b) copolymerizing the monomers to form precursor latex particulates dispersed within the hydrophilic phase; and
   c) reacting the precursor latex particulates with a base to form epoxide group-functionalized latex particulates.

2. A method as in claim 1, wherein the support-forming monomers are film-forming monomers selected from the group consisting of acrylic acid, methacrylic acid, acrylates, methacrylates, and combinations thereof.

3. A method as in claim 2, wherein the film-forming monomers are acrylic acid or acrylates cUbe formula:

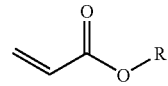

where R is $C_1$-$C_8$ alkyl, aryl, substituted aryl, or H.

4. A method as in claim 1, wherein the epoxide group-forming monomers include a —CH(OH)—$CH_2$-LG group, where LG is a leaving group, said leaving group configured such that upon reaction with the base, the leaving group is removed and an epoxide group is formed.

5. A method as in claim 4, wherein the leaving group is selected from the group consisting of halides, —OMs, —OTs, and —OTf, where Ms is mesityl, Ts is p-toluenesulfonyl, and Tf is trifluoromethanesulfonyl.

6. A method as in claim 1, wherein the base is selected from the group consisting of alkali hydroxides, alkali carbonates, trialkylamines, alkali metal oxides triethylenediamine (DABCO), 1,8-diazabicyclo[5,4,0]undec-7-ene (DBU), and combinations thereof.

7. A method as in claim 1, wherein the epoxide group-functionalized latex particulates have weight average molecular weight from about 10,000 Mw to 5,000,000.

8. A method as in claim 1, wherein the molar ratio of epoxide group-forming monomers to support-forming monomers is from 1:1000 to 1:10.

9. A method as in claim 1, wherein the support-forming monomers are present as multiple monomer types.

* * * * *

UNITED STATES PATENT AND TRADEMARK OFFICE
CERTIFICATE OF CORRECTION

| | | |
|---|---|---|
| PATENT NO. | : 7,465,765 B2 | Page 1 of 1 |
| APPLICATION NO. | : 10/952262 | |
| DATED | : December 16, 2008 | |
| INVENTOR(S) | : Sivapackia Ganapathiappan et al. | |

It is certified that error appears in the above-identified patent and that said Letters Patent is hereby corrected as shown below:

In column 12, line 16, in Claim 3, delete "cUbe" and insert -- of the --, therefor.

In column 12, line 40, in Claim 7, after "have" insert -- a --.

In column 12, line 41, in Claim 7, after "10,000" delete "Mw".

Signed and Sealed this

Fourteenth Day of July, 2009

JOHN DOLL
*Acting Director of the United States Patent and Trademark Office*